INVENTOR.
GEORGE E. FREDERICK
BY John G. Young
ATTORNEY

Aug. 1, 1961  G. E. FREDERICK  2,994,442
KINETIC ENERGY ABSORBING DEVICE
Filed June 20, 1960  5 Sheets-Sheet 3

INVENTOR.
GEORGE E. FREDERICK
BY
John A. Young
ATTORNEY

Aug. 1, 1961 G. E. FREDERICK 2,994,442
KINETIC ENERGY ABSORBING DEVICE
Filed June 20, 1960 5 Sheets-Sheet 5

INVENTOR.
GEORGE E. FREDERICK
BY
John A. Young
ATTORNEY

United States Patent Office 2,994,442
Patented Aug. 1, 1961

2,994,442
KINETIC ENERGY ABSORBING DEVICE
George E. Frederick, South Bend, Ind., assignor to The Bendix Corporation, South Bend, Ind., a corporation of Delaware
Filed June 20, 1960, Ser. No. 37,216
11 Claims. (Cl. 213—43)

This invention relates to a kinetic energy absorbing device and more particularly, to a draft gear which is combined with a railway coupling to provide a cushioning effect during draft and buff operations by absorbing a portion of the kinetic energy transmitted between the coupled cars and thereby safeguarding the equipment against damage.

During coupling operation, when the railway cars are brought together, the one moving and the other stationary, considerable impact forces are brought to bear through the coupling devices on the railway cars, and that portion of this energy which is not absorbed in some suitable manner by cushioning devices, will exert destructive forces on the cars in the form of damage to the center sills, the car frame or other portions of the railway car structure. Since the magnitude of these coupling energies is in the order of 400,000 ft. pounds of energy it can be easily appreciated that the forces must be cushioned in some suitable manner to avoid wasteful destruction. Likewise, draft forces i.e. pulling forces between the cars, must be cushioned because of the high momentum involved in order that jarring forces transmitted between the railway cars can be safely absorbed without producing damage to the cars.

One of the objects of the present invention is to provide a draft gear having a cushioning device which will communicate acceptable forces between the cars without producing damage to the center sill. The present invention proposes a cushioning device which aborbs the kinetic energy of draft and buff in an efficient manner, and operates in such manner that forces transmitted between the cars are maintained within maximum limits to preclude damage to the cars.

Another object of the invention is to provide a cushioning draft gear which incorporates a frictional means for dissipating a part of the energy, the operation of which is made more efficient during buff and draft gear operation. Another object of the invention is to incorporate a combination friction and pneumatic-hydraulic energy absorbing means wherein a greater proportion of the kinetic energy is dissipated, as distinguished from merely stored, so that following coupling operation the kinetic energy stored is available for restoring the gear but is itself not a source of potential damage.

A further object of the invention is to provide a railway draft gear having a kinetic energy absorbing device which is functionally more efficient in dissipating the kinetic energies of draft and buff operations to minimize damage.

An important feature of the invention lies in its greater efficiency of absorbing energy, and also in determining the maximum load transmitted thereby between the cars if a definite proportion of the load transmitted is made available for restoring the device to its original condition when the draft and buff forces on the gear are relieved. By virtue of the operation of the hydraulic portion of the unit, it is possible to build up the resistance load to buff or draft forces at a much faster rate so that a greater proportion of the energy is absorbed, but the maximum resistance load from the hydraulic portion of the unit is itself brought within controllable limits so that damage to the draft gear is avoided. A combination of these two considerations, makes for superior draft gear operation which has greater efficiency and embodies internal safety devices which insure freedom from damage to the gear in draft and buff.

Other objects and features of the invention will become more apparent from a consideration of the following description, which proceeds with reference to the accompanying drawings, wherein:

FIGURE 12 is an end view of the embodiment shown in FIGURE 11, looking in the direction of the arrows 12—12 in FIGURE 11; and, FIGURE 13 is a Load vs. Stroke graph which shows the energy absorbing characteristics of the present invention and compares it with the curve obtained with a conventionally used prior art device. From these curves efficiency as well as operating characteristics can be interpreted.

Figures 1, 5:
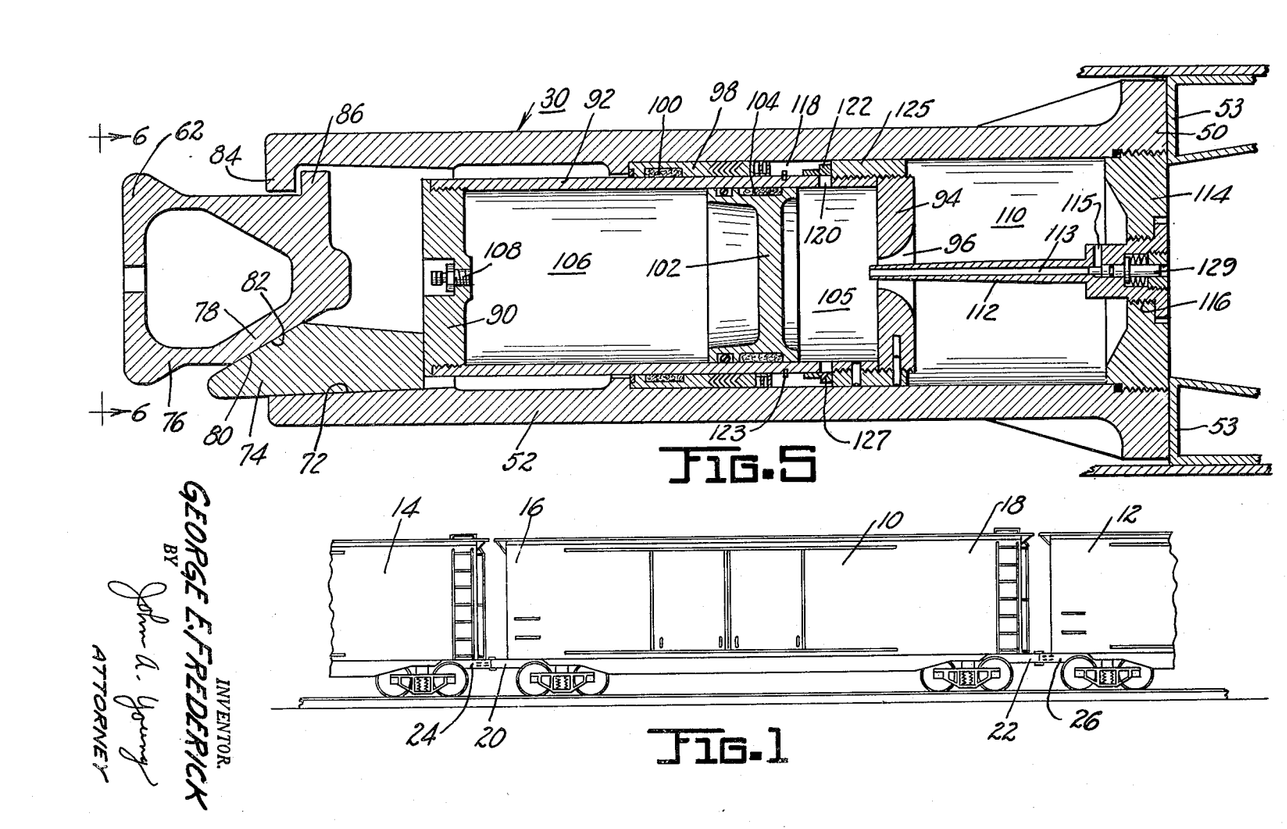
FIGURE 1 illustrates a railway car and two coupled cars in fragmentary view at its opposite ends.
FIGURE 5 is an enlarged detail sectional view throughout the length of the gear and illustrating the cushioning device which is embodied within the draft gear. The gear incorporates one suitable friction means which forms a part of the kinetic energy absorbing media.

Referring now to the drawings, there is shown in FIGURE 1 a box car 10 which is coupled with cars 12 and 14 at its ends 16 and 18 through draft gears 20 and 22. The draft gears 20 and 22 are coupled with cars 12 and 14 through similar gears 24 and 26.

Figure 2:
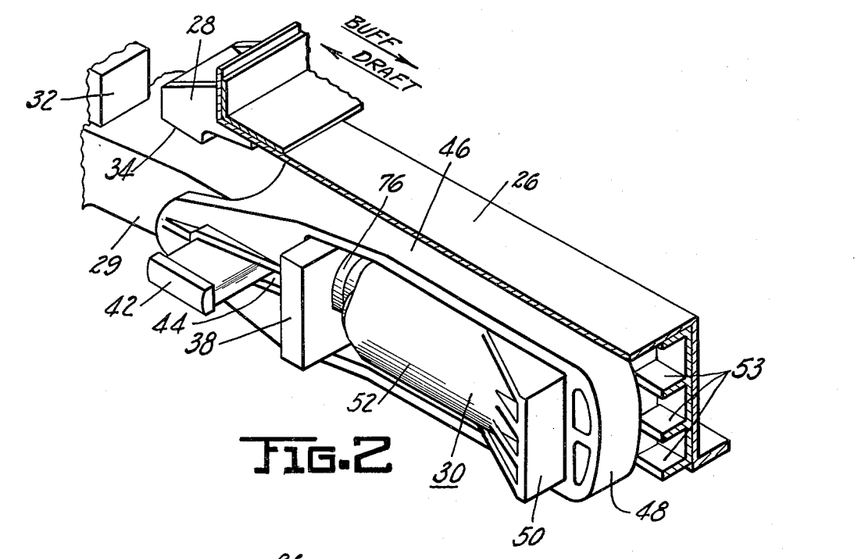
FIGURE 2 is an isometric detail view of a draft gear which incorporates the present invention.
Figure 3:
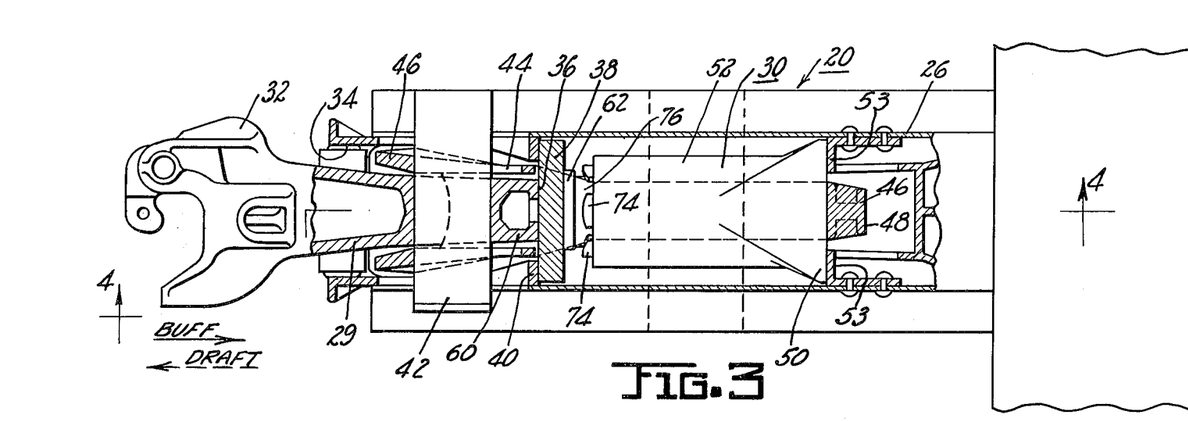
FIGURE 3 is a top view of the draft gear, showing the coupling member at one end thereof, the center sill of the car being broken away and a portion of the structure being shown in section to illustrate the yoke, follower plate, and location of the draft gear between its stops.
Figure 4:
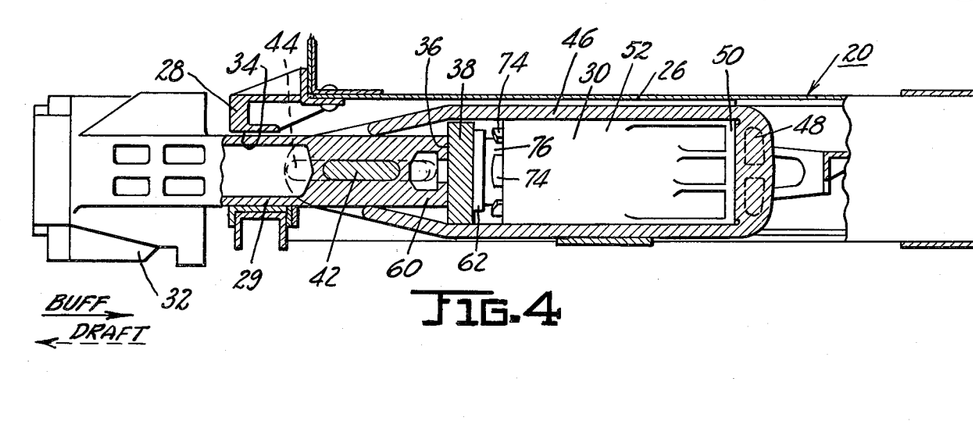
FIGURE 4 is a section view taken on line 4—4 of FIGURE 3.

Referring next to FIGURE 2, an isometric view of the draft gear, and its connecting structure, and to FIGURES 3 and 4, there is illustrated a center sill 26 which forms a part of the frame of the car and the usual horn 28 which limits contraction of the draft gear in the event of failure of the cushioning device which is designated generally by reference numeral 30. The draft bar 29 having a coupling element 32 is passed through an opening 34 (FIGURE 3 and 4) and bears at its end 36 against a follower plate 38 which in turn bears against a stop 40 provided by the center sill 26 thereby preventing movement of the follower plate 38 leftwardly from the position shown in FIGURES 2, 3 and 4.

The draft bar 29 has a flat key 42 which is passed through an opening 44 of the draft bar 29 and is fastened thereto, the flat key 42 being passed through an elongated opening 44 in yoke 46. The yoke 46 is drawn leftwardly (FIGURES 2, 3 and 4) by leftward movement of the draft bar 29, but remains stationary when the draft bar 29 moves rightwardly since the flat key 42 then moves within elongated opening 44. The end 48 of the yoke 46 is in abutting relation with the base 50 of casing 52 which forms a part of the cushioning device 30 and the base 50 bears against flanges 53 which form a part of the center sill structure 26 and are rigidly secured thereto. Thus, during buff operation which is represented by the solid line arrow in FIGURES 2, 3 and 4 the draft bar 29 communicates load through its end 60 to follower plate 38 which in turn acts against the end 62 of the cushioning device 30 which is held against movement by engagement of base 50 with stops 53. Since the buff forces are communicated to the car through the cushioning device 30 then a major part of the kinetic energy which is involved in the process of car coupling, will be dissipated without producing destructive forces on the railway car; thus, should the car 10 be stationary and the car 14 moving rightwardly (FIGURE 1) as the train moves into coupling relation with the stationary car 10 and its connected car 12, the cars 10 and 14 will be coupled and the buff forces dissipated through the device 30. During draft operation, assuming that the train is moving leftwardly in FIGURE 1, should the car 10 lag behind the drawing car 14 with which it is coupled, there will be produced a pulling force in the direction of the dotted line arrows in FIGURES 2, 3 and 4 in which case, the draft bar 29 moves the flat key 42 leftwardly in FIGURES 3 and 4 pulling the yoke 46 therewith. The end 48 of the yoke 46 acts against base 50 of the cushioning device 30 and the cushioning device 30 anchors through its end 62 on follower plate 38 which is held by abutment 40 secured to the center sill 26. In this manner, the draft forces are communicated through cushioning device 30 before they are transmitted to the car 10 through abutment 40 in center sill 26 and thus cushioning prevents destructive forces acting on the drawn end of the car.

Figure 6:
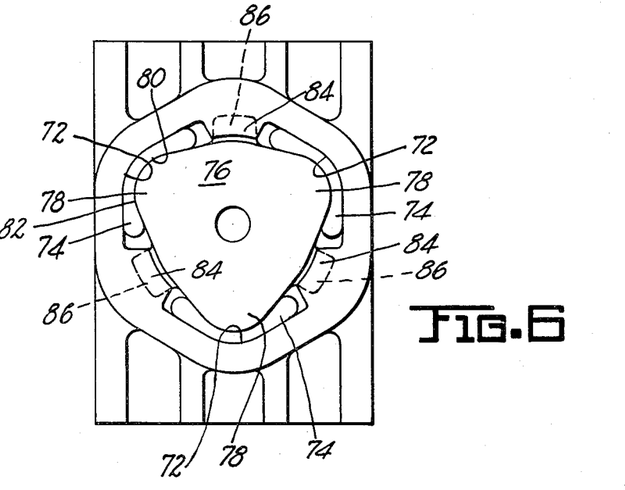
FIGURE 6 is an end view of FIGURE 5 looking in the direction of the arrows 6—6 in FIGURE 5.
Figure 7:
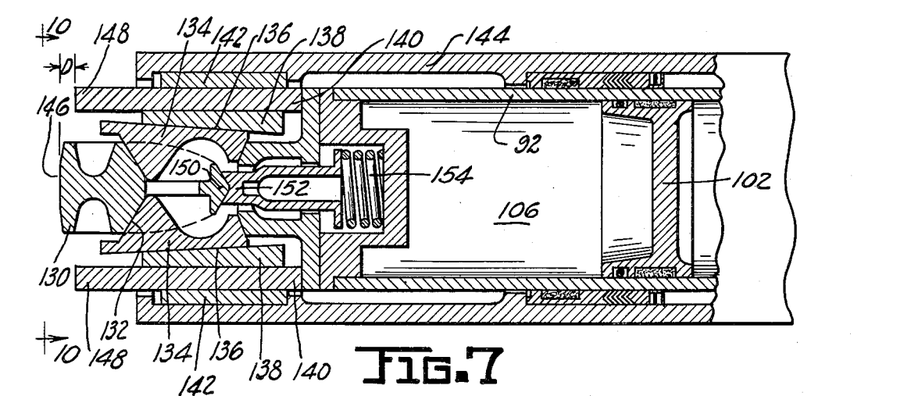
FIGURE 7 is an enlarged detail view showing in section, a second embodiment of the invention illustrating a different friction means which can be used with the air-hydraulic unit shown in FIGURE 5.
Figure 8:
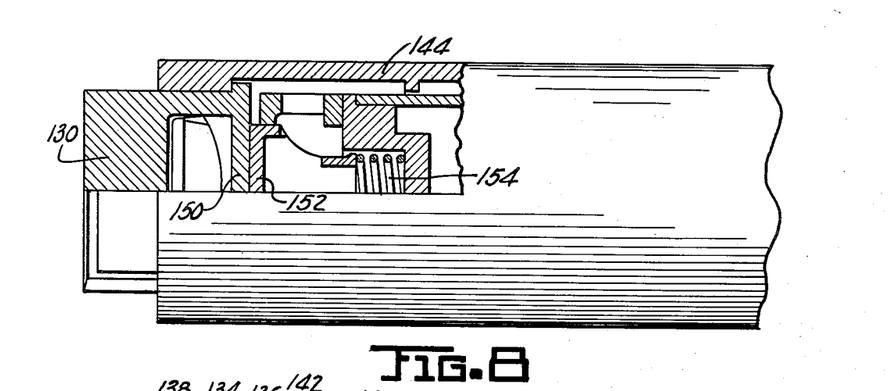
FIGURE 8 is a top view of the embodiment shown in FIGURE 7, the upper half of the view being shown in section taken midway through the device.
Figure 9:
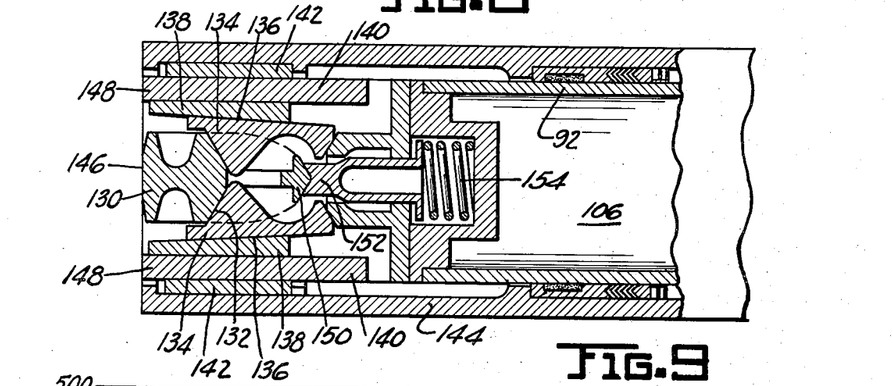
FIGURE 9 is a view similar to FIGURE 7 but, showing the relationship of the components during compression stroke as it appears during draft or buffing operation.
Figure 10:
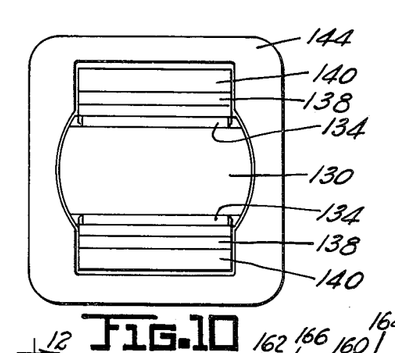
FIGURE 10 is an end view of FIGURE 7 looking in the direction of the arrows 10—10 in FIGURE 7.

Referring next to FIGURES 5 and 6, there are shown details of the construction of cushioning device 30 which is a combination of frictional, pneumatic and hydraulic energy absorption media. The device 30 includes a casing 52 having three spaced internal friction surfaces 72 (FIGURE 6) which are located about 120° apart one from the other. The three friction surfaces 72 have friction shoes 74 which are contoured to fit flatly against their opposed friction surfaces 72 and are slidable along the length of surfaces 72 by a wedge 76 having rounded projections 78 (FIGURE 6) extending within each shoe. The companion surfaces 80 and 82 of the shoes and wedge respectively, are tapered, as shown in FIGURE 5 so that the wedge 76 develops a biasing effect, thrusting the shoes 74 outwardly against the opposed friction surfaces 72 of the casing 52.

Lugs 84 are formed integrally with the end of the casing 52 and project radially outwardly to provide limit stops which are engaged by lugs 86 on the wedge 76 thereby defining the limit of extension of the cushioning device 30. That is, at the time that the device 30 is assembled, the wedge 76 is biased inwardly against resistance of the internal structure (which will later be described) of the cushioning device 30 and the tendency of that stored energy to extend the device is limited by engagement of the lugs 36 with lugs 84.

As shown in FIGURE 5, the shoes 74 engage the plugged end 90 of a tubular member 92 having a diaphragm 94 with metering orifice 96 therein. Between the tubular member 92 and casing 52 is a bearing 98 having seal 100. Within the tubular member 92 is a floating piston 102 having a seal 104, the piston 102 being a movable wall which separates the interior of the tubular member two variable volume chambers one a hydraulic chamber 105 and the other a pneumatic chamber 106 which is charged with air through an air valve 108.

A second variable volume chamber 110 defined by the interior of the casing 52 is also filled with hydraulic fluid and is communicated with chamber 105 through the metering orifice 96. Metering pin 112 having a longitudinal passage 113 and a radial passage 115 opening into chambers 105 and 110 respectively (FIGURE 5) is mounted in end wall 114 through threaded connection 116 and is movable through the metering orifice 96 to control the effective metering area and determine resistance to hydraulic flow from chamber 110 to chamber 105 through the orifice 96.

Between the tubular member 92 and the inner surface of casing 52 is an annular chamber 118 which communicates with chamber 105 through openings 120. The chamber 118 is an expanding chamber during contraction of the cushioning device 30 and fluid is exhausted from chamber 118 as the cushioning device 30 elongates. A snubbing device 122 is movable against stop 123 during expansion of the chamber by contractile movement of the device 30 to allow freedom of fluid flow within the chamber 118 and the snubbing device 122 is caused to seat against an annular ring nut 125 to close the openings 120 during elongation of the cushioning device 30 during which time fluid is exhausting from chamber 18. The fluid exhausts from chamber 118 is thus forced to go through small openings 127 to retard the rate of extension of the cushioning device 30 and thereby prevent damage.

There is further provided within the end wall 114 a spring loaded relief valve 129 which vents fluid directly from chamber 110 to chamber 105 through passages 115 and 113 in the event that excessive coupling forces develop excessive fluid pressures in chamber 110. The operation of the coupling device will be next considered.

*Operation of the device*

Figure 13:
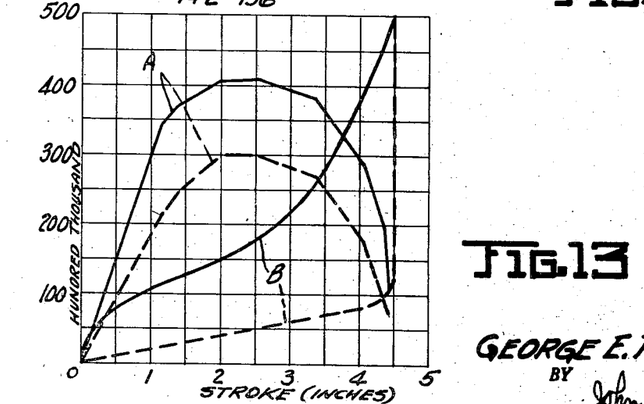

During either buff or draft operations, force is communicated from the coupling member 32 to the car through the cushioning device 30. In bringing the railway car to a different velocity, force is inevitably brought to bear on the car, but, as it will be seen, the cushioning device determines the rate of change in momentum which is communicated to the car, and absorbs at least a portion of the impact during the period that the car is changing its momentum to prevent damage. When impacts are developed on coupling member 32 either in buff (toward the right FIGURE 3) or draft (toward the left in FIGURE 3) force is communicated to the railway car through the cushioning device 30 to produce a telescoping movement of the cushioning device 30. Assuming buff loads, the base 50 is held stationary against stops 53 and the wedge 76 is forced toward the right by the draft bar 60 and a follower plate 38. Referring to FIGURE 13 which is a Load vs. Stroke curve, the resistance to fluid metering from chamber 110 to chamber 105 will immediately be effective to oppose longitudinal movement of the shoes 74 toward the right by virtue of their engagement with end 90 of the tubular member 92; and this counterreaction to the force developed on wedge 76 will effect radially outward thrust on the shoes 74 against their opposed friction surfaces 72 of the casing. Slidable movement of the shoes 74 on surfaces 72 will develop frictional heat which dissipates a part of the kinetic energy communicated to the car.

In operation, approximately twenty-five to forty percent of the kinetic energy absorbed by the cushioning device 30, is absorbed frictionally in the manner described. The efficiency of operation of the shoes 74 is determined, at least in part, by developing a high normal load between the shoes and their opposing frictional surface from the very beginning of the stroke of the cushioning device; and also, sustaining such normal load over the entire stroke length of the cushioning device. Because the hydraulic device, develops an almost immediate counterreaction to telescoping movement and such counterreaction is communicated immediately to the shoes through the tubular member 92 as a force opposing their movement, the input force on the end 62 of the wedge 76 will develop at the very beginning of the stroke a substantial degree of spreading movement of the shoes which is a function of the metering resistance through orifice 96.

In FIGURE 13 the area under the curve represents the amount of work absorbed by the device 30 and the area under the curve divided by the area under a horizontal line passing through the maximum resistance force is a measure of the efficiency of the device. The area between the full line and dotted line hump curves represents the energy absorbed frictionally and it will be seen from the curve that the frictional work increases rapidly from the start of the stroke to a maximum, continues unabated and then falls off rapidly only at the end of the stroke. This rapid rise of frictional resistance accounts for the greater efficiency in dissipating the impact loads by means of the frictional media. Heretofore, variable resistance members were provided as the backing for the friction shoes 74 and since the counterreaction force on shoes 74 is variable, building up to a maximum as shown by the curve labelled B, FIGURE 13, the normal load of engagement of the shoes builds up gradually and hence during operation of the cushioning device frictional absorption of energy is ineffectual until the terminal part of the stroke. Inevitably, the device is made more inefficient. In the present invention, however, by means of the novel cooperation between the hydraulic and pneumatic cushioning device which backs up the friction shoes 74 there is a substantially constant resistance force to slidable movement of the shoes 74 which develops a substantially constant normal force of engagement between the shoes 74 and their opposing surface and therefore more efficient usage can be made of frictional dissipation of the kinetic energy.

That portion of the energy which is not dissipated frictionally, is communicated from shoes 74 to the tubular member 92 causing its telescoping movement toward the right in FIGURE 5 thereby exhausting fluid from chamber 110 through orifice 96 into chamber 105 which is an expanding chamber. Both of the chambers 105 and 110 are completely filled with fluid and although their relative volumes will change during operation, the loss of volume of one is balanced by an enlargement in volume of the other. The resistance to stroking or telescoping movement of the cushioning device through the metering orifice 96 is shown in FIGURE 13 and the load value is determined by suitable contouring of the metering pin 112. It is characteristic of metering pin devices, that the load will rapidly increase to a predetermined value which will occur at the beginning of the stroke and will continue substantially undiminished until the end of the stroke. It is thus possible, to determine the maximum force which is communicated through the cushioning device to the center sill of the car by contouring the metering pin 112 in orifice 96 the upper limit of the pressure being fixed by operation of the check valve 129. Thus, in FIGURE 13, the upper limit of load taken through the cushioning device will not exceed about 500,000 lbs. and any force in excess of this is taken by bottoming out of the follower plate 38 on the casing 52 which transmits the load directly to the center sill through stops 53. These figures are in no way limitative of the invention, but merely illustrate how the invention can be used to advantage from knowing what the maximum fluid pressure value is and then constructing the metering pin, orifice and check valve so as not to exceed that value.

The energy which is absorbed by metering of fluid from chamber 110 to chamber 105 through orifice 96 and the energy absorbed by compressing the pneumatic charge is represented by the area under the dotted curve labelled A in FIGURE 13; the area between the full line curve A and dotted line A is the energy absorbed frictionally, and the efficiency of the device is measured by the percentage that the total area under the curve bears to the entire area bounded by a horizontal line taken through the maximum load value. Since a spring force load is zero at the beginning of the stroke and increases at a substantially constant slope to a maximum value, there is produced a different shape curve represented typically by the curve labelled B in FIGURE 13.

Comparing the respective areas bounded by curves A and B it will be seen that area B is considerably smaller than the area A which generally approaches 75–85% efficiency during operation. The curve B was obtained with a Miner draft gear class RF–75–M and was designed for a 36″ pocket and included a rubber plate media spring return. The total energy absorbed was 75,375 ft.-lbs. vs. a total of 110,833 ft.-lbs. of energy absorbed by the same size draft gear constructed in accordance with the present invention. Testing was performed with a 27,000 lb. hammer and the stroke length for each device was approximately 4½ inches. The energy frictionally absorbed by the draft gear under curve B was 59,169 ft.-lbs. and the recoil energy was 16,206 ft.-lbs. representing 21.5% of the total energy.

From a comparison of the two draft gears, in FIGURE 13, it is apparent that through a given stroke, a greater amount of kinetic energy can be absorbed by means of a hydraulic device than by a spring device and the energy absorbed by the hydraulic portion of the device, is completely dissipated and is not merely stored as is the case with a spring force so that the problem of releasing such stored energy is not present. Importantly, the resistance to stroking of the device builds up to a near maximum at the very beginning of the operation so that high normal loads are obtained for the friction shoes thus leading to greater efficiency in utilization of the frictional media. During stroking of the tubular member 92 the fluid entering chamber 105 biases piston 102 (FIGURE 5) toward the left thereby compressing the air in chamber 106 which has been previously charged to about 630 p.s.i. That portion of the kinetic energy which is not frictionally dissipated, nor hydraulically dissipated by the metering action, is stored in the form of compression of the air within chamber 106 by the floating piston 102.

When the coupling forces are relieved, the cushioning device is extended by means of the compressed charge of air within chamber 106 which develops return forces in the order of eight to ten thousand pounds force. The piston 102 is forced toward the right, exhausting fluid from chamber 105 and returning it to chamber 110 through the orifice 96, the chamber 110 being expanded by the admitted fluid. The fluid entering chamber 110 from chamber 105 reacts against the orifice diaphragm 94 thus causing extension of the cushioning device until follower plate 38 is brought into engagement with its stop 40 (FIGURE 3) and the base 50 is in engagement with its stop 52. A typical stroke length for the cushioning device is about 4–5 inches of travel, and if the travel should be in excess of this then the follower plate 38 engages the end of the casing 52 and force is communicated directly to the center sill 26 through stops 52. In both buff and draft operations, the follower plate will engage the casing when the stroke is in excess of a predetermined amount or exceeds a predetermined force whereupon force is transmitted directly to the center sill and bypasses the cushioning effect.

Referring next to the embodiment in FIGURES 7 through 10, it will be seen that different frictional dissipating means can be combined with an air-hydraulic energy absorption device of the type shown in FIGURE 5. The frictional portion of the gear is adopted from one constructed by Cardwell Westinghouse and identified as Westinghouse Type NZ–11–F friction draft gear.

An inner wedge member 130 having tapered surfaces 132 engages wedges 134 and the wedges, have inclined faces 136 to force friction members 138 outwardly so that the shoes 140 are clamped between friction members 138 and friction members 142 which are retained by casing 144. The end 146 of inner wedge member 130 is displaced from the ends 148 of the shoes by the distance D so that the inner wedge 130 and wedge 134 are moved through the distance D before contact is made with the ends 148 of the shoes 140. The inner wedge 130 has an end 150 which engages stem 152 and displaces it against the resistance of spring 154. Relative movement of the inner wedge 130 through the distance D effects outward camming movement of friction members 138 through the wedge 134 thereby clamping the shoes 140 between friction members 138 and 142. After the inner wedge 130 travels through the distance D contact is then made with the shoes 140 which are backed up by the tubular member 92 the same as in the previous embodiment and the constancy of the backup force which is developed from the hydraulic portion of the unit produces a constancy of frictional energy dissipation. The coupling forces move the components of the device from their relative positions shown in FIGURE 7 to the positions shown in FIGURE 9. When the coupling forces are relieved, the spring 154 (FIGURE 9) biases the inner wedge member 130 retractively (leftwardly) and thereby assists in frictionally disengaging the outer wedge 134 from the friction member 138 thereby releasing clamping of shoes 140 between the friction members 138 and 142 and thereby permitting the compressed air within chamber 106 to extend the device. The releasing spring 154 and its related means stem 152, end 150 and inner wedge 130 insure an adequate disengagement of the friction members from the shoes so that the shoes will not be wedged in place between the friction members to resist release with a force greater than the return force or restoring force from the compressed air in chamber 106.

The embodiment shown in FIGURES 7–10 operates similarly to the embodiment previously described with the exception that the frictional means for dissipating a portion of the kinetic energy is provided by means of two shoes 140; but, the cooperation between the hydraulic and pneumatic portion of the unit and the friction means remains the same in that a greater efficiency of frictional dissipation of the coupling energy is realized as well as the improved hydraulic-pneumatic operation per se.

Figure 11:
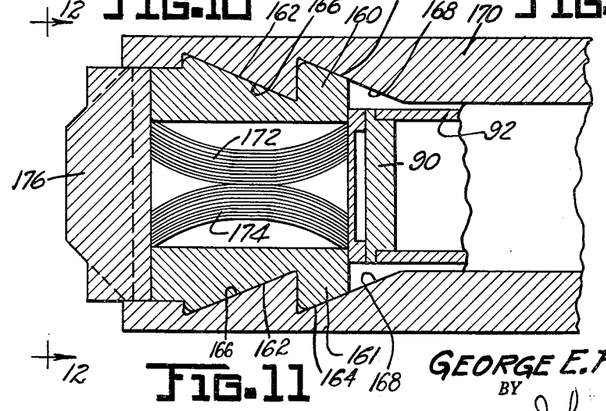
FIGURE 11 is a further embodiment of the invention showing a different frictional means which can be used with an air-hydraulic unit shown in FIGURE 5.
Figure 12:
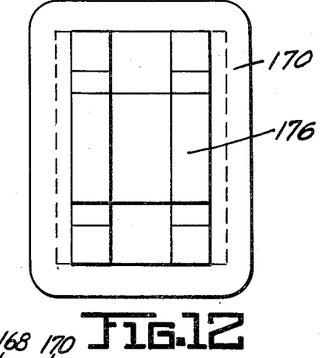

Referring next to the embodiment shown in FIGURES 11 and 12, a further variation of frictional means is shown which is suitable for use in connection with the air-hydraulic portion of the device in FIGURE 5. The frictional means is taken from a Waugh-Gould Type 420 friction draft gear manufactured by Waugh Equipment Company. The frictional absorbing means in FIGURES 11 and 12 comprises two frictional shoes 160 and 161 having inclined surfaces 162 and 164 which are in sliding engagement with surfaces 166 and 168 of casing 170. Leaf springs 172 and 174 are formed in stacks to effect a spreading action on the shoes 160 and 161 to produce frictional engagement between the shoes 160, 161 and their opposed surfaces 166 and 168 provided by casing 170. The main source of normal load between the shoes 160, 161 and the opposed casing is derived from counterreaction from the end 90 of tubular member 92, so that as the end 176 of the draft bar is moved toward the right, the counterreaction from the pneumatic-hydraulic means increases the normal load and any longitudinal movement of the end 176 toward the right will develop a frictional resistance which dissipates a part of the buff or draft momentum. The balance of the momentum is absorbed by the pneumatic-hydraulic portion of the unit which may be the same as that provided in the previously described embodiment. This will illustrate, that a substantial variety of frictional means can be used in conjunction with a pneumatic-hydraulic unit and the benefits of the invention will be retained because of the high value of counterreaction force from the hydraulic unit which will produce an almost immediate high order of frictional resistance which will be sustained at a high level throughout the major portion of the buff or draft operation and hence the same degree of improvement in the frictional operation of the gears obtained as described by virtue of the high order of normal load between the friction surfaces which is sustained substantially constant during draft gear operation in order to obtain maximum utility from the friction members.

Although the invention has been described, in conjunction with but a few selected embodiments of the invention, it will become apparent to those skilled in the art, that numerous modifications and revisions can be made while yet incorporating the principles herein disclosed. It is intended therefore, that such variations and revisions of the invention as can be expected on the part of those skilled in the art, and which incorporate the herein disclosed principles, will be included within the scope of the following claims as equivalents of the invention.

I claim:

1. A railway draft gear for coupling cars and cushioning the impact of draft and buff forces comprising a coupling member, means secured to a railway vehicle and defining two fixed stops, a cushioning device disposed between said two fixed stops and engaged by said gear to communicate coupling and draft loads through the cushioning device which is anchored on one or the other of said stops depending on the direction of communicated force, said cushioning device including a wedge block contacting one of said stops, a plurality of friction shoes having inclined surfaces of engagement with the wedge, a casing proportioned to receive the shoes for slidable movement therein and providing an internal bearing surface against which the shoes are spread to develop frictional resistance to compression of the cushioning device, means defining an abutment surface at the end of said casing opposite its shoe receiving end and engaging one of said stops, a pneumatically charged sealed chamber within said casing defined by a cylinder and two end walls one engaging said shoes and the other being a free floating piston slidably mounted in said chamber, a hydraulic chamber in said cylinder including a floatable piston and a diaphragm having a metering orifice therein, a second hydraulic chamber in the interior of said casing and having communication with said first mentioned hydraulic chamber through said metering orifice, an end wall of said second chamber connected to said casing and having a metering pin movable through said metering orifice to control the resistance to telescoping movement of said cushioning device, and sealing means providing a bearing surface between said cylinder and the interior wall of said casing, said pneumatically charged chamber being contracted by expansion of said first hydraulic chamber during buff and draft cushioning to absorb a part of the impact energy and thereafter providing extension of said device to its original length and effecting hydraulic fluid distribution to its original condition between said first and second chambers.

2. Railway draft gear for cushioning the impact of draft and buff forces and communicating locomotive force to railway vehicles, comprising a draw bar having a coupling device at one end thereof, a bumper end and draft pin at the opposite end thereof, means connected to said draft pin for communicating draft forces through said draw bar, means secured to the railway vehicle and defining two spaced stops which are in fixed spaced relation one to the other, and a cushioning device disposed between said fixed stops to receive the impact of buff and draft forces and communicate them to the railway vehicle through one or the other of said stops, said cushioning device including a plurality of friction shoes having slidable bearing with an opposed surface to resist telescoping movement of the device and thereby dissipate a portion of the force communicated to said device, means for translating said shoes along their opposed bearing surface, two telescoping tubular members in slidable bearing relation and each defining a hydraulic fluid chamber and including an orifice diaphragm separating said chambers whereby fluid can be transferred between the two chambers, a metering pin movable by one of said tubular members to control the effective metering area of said orifice, and resilient means which is loaded responsive to development of hydraulic fluid pressure during compression of said device by the telescoping movement thereof and thereby store energy available for extending said device to its original condition following draft and buff energy absorbing operations.

3. A cushioning device for absorbing impact in railway draft and buff equipment comprising a casing having an inner friction surface, a plurality of friction shoes in sliding relation with the friction surface of said casing, a wedge block having an inclined surface of engagement with the adjacent opposed surfaces of said shoes to effect spreading movement thereon and further to produce sliding action between said shoes and their opposing surface to dissipate a part of the kinetic energy of impact, means defining two fixed stops on which said device takes support at its opposite ends whereby as draft force is communicated to one end of said device or buff force is communicated to the opposite end of said device the device is held at its end oppositely to the impact force by one or the other of said steps, a telescoping member within said casing operatively engaged with said shoes to receive the energy of impact which is frictionally unabsorbed, a first hydraulic chamber in said telescoping member, resilient means disposed within said casing and adapted to receive the pressure produced within said hydraulic chamber for compression thereby, an orifice plate at the end of said telescoping member, a second hydraulic chamber within said casing communicating with said first chamber through said orifice, and a metering pin supported by said casing and movable through said orifice to control its effective metering area whereby impact of buff and draft is dissipated by metering fluid flow from said second hydraulic chamber to said first hydraulic chamber which is expanded during telescoping movement to compress said resilient means which stores energy effective for restoring the device when the external forces on said device are relieved.

4. A device for cushioning the impact of kinetic forces during draft and buff operation in railway coupling operations comprising a casing, fixed frictional surfaces provided by said casing, a plurality of shoes slidably movable on said frictional surfaces to dissipate a part of the kinetic energy of draft and buff operations, wedge means at one end of said device for receiving impact loads and exerting both spreading and translatory movement of said shoes on said frictional surfaces, a tubular member mounted for telescopic movement within said casing and having an operative connection with said shoes to receive the impact unabsorbed by frictional resistance, an orifice diaphragm carried by said telescoping member to define two variable volume hydraulic fluid chambers one within the confines of said casing and the other within the confines of said telescoping member, a metering device for controlling the effective metering area of said orifice to control the resistance to telescoping movement and determine the rate of kinetic energy absorption, and resilient means which is loaded responsively to telescoping movement of said tubular member within said casing and thereby storing energy effective for elongating said device to its original position when the coupling forces are relieved.

5. A device for cushioning the impact of buff and draft forces in railway coupling equipment and in combination with two fixed stops one at each end of said device to provide abutments against which the draft gear bears in one direction for draft and in the other direction for buff, said device comprising a casing disposed against one of said stops and a wedge disposed against the other of said stops, a plurality of friction members engaged by said wedge and slidably movable within said casing to dissipate a part of the kinetic energy, two hydraulic chambers within said casing having a metering orifice therebetween and a metering pin controlling its effective metering area whereby an additional portion of the kinetic energy is hydraulically dissipated, one of said hydraulic chambers being contractible by telescoping movement to exhaust fluid therefrom to the other of said chambers, and resilient means also disposed within said casing and adapted to be responsive to the pressure produced by hydraulic pressure effected from telescoping movement producing flow through said metering orifice and having sufficient contraction during draft and buff operations to store energy providing extension of said device when draft and buff forces are relieved.

6. A device for absorbing the kinetic energy impact of draft and buff operations in railroad equipment, comprising a draw bar having a coupling member at one end thereof, a casing, a wedge having inclined surfaces and longitudinally movable by said draw bar, longitudinally movable friction shoes located for engagement with said friction means and slidably movable by said draw bar during draft or buff operation to frictionally absorb a part of the kinetic energy, a tubular member having two variable volume chambers therein one pneumatic and the other hydraulic and separated by a movable wall therein, means forming an operative thrust connection between said wedge and tubular member to effect its telescoping movement within said casing, a second hydraulic chamber with said casing, a diaphragm separating said first and second chambers and having communication therebetween through a metering orifice whereby fluid is metered from said second to said first chamber during telescoping movement with an accompanying contraction of said pneumatic chamber, and a metering pin controlling the effective area of said metering orifice, metering of said fluid having an energy dissipating effect and providing energy storage in the form of compressed pneumatic charge effected by movement of said piston to provide extension of said device to its original position when buff and draft forces are relieved.

7. A kinetic energy absorbing device for cushioning draft and buff forces in railway operation, comprising a casing having inclined friction surfaces, means mounted for slidable movement on said surfaces and receiving the impact of draft and buff forces to dissipate a portion of the impact in frictional heat, resilient means biasing said slidable means against the opposed surface of engagement, and a telescoping combination air-and-hydraulic unit having one end in operative engagement with said slidable means to recive the undissipated balance of buff and draft kinetic energy, said unit including two variable volume chambers having interconnecting metering means for dissipating a portion of the kinetic energy and a pneumatic chamber having a movable wall separating it from the hydraulic chamber which expands during energy absorbing operation to effect contraction of the pneumatic chamber and thereby store a part of the energy which provides expansion of the device to its original position when draft or buff forces are relieved.

8. The kinetic energy absorbing device in accordance with claim 7 including hydraulic damping means for impeding expansion of the device by the energy stored in said pneumatic chamber.

9. The kinetic energy absorbing device in accordance with claim 7 including a pressure responsive valve for relieving pressure in the hydraulic chamber which exhausts fluid during contraction of said device to limit pressure therein to a predetermined value.

10. A device for cushioning the impact of buff and draft forces in railway coupling equipment in combination with abutment means at each end of said device against which the device bears in one direction to cushion draft load and in the other direction to cushion buff load, comprising casing means having an open end providing thereat frictional surfaces at the interior portion of said open casing end, a plurality of friction shoes including wedge faces and having slidable bearing with said frictional surfaces to dissipate frictionally a portion of the impact forces communicated to said device, shoe translating means for sliding said shoes on their frictional surfaces and acting through the wedge faces of said shoes, a tubular member mounted for longitudinal movement within said casing, two hydraulic chambers each defined by relatively inflexible walls and one of which is defined by said tubular member and the other of which adjoins said one chamber to exhaust fluid between said fluid chambers, during cushioning movement of said device, means having a metering orifice which connects said chambers to vent fluid therebetween and to develop a resistance to longitudinal movement between said casing and tubular member which is proportional to the rate of such movement, thrust connection means between said tubular member and said shoes to resist translatory movement thereof on their opposed frictional surfaces whereby both hydraulic and frictional resistance is provided in proportion to the rate of cushioning movement of said device and in substantial magnitude at initial loading of said cushioning device, and resilient means located within said casing and acting against said shoes to oppose their sliding movement in one direction and to receive a portion of said impact forces which are stored by said resilient means, the stored energy of said resilient means being effective to provide force for restoring said cushioning device when the imposed forces are relieved.

11. The cushioning device structure in accordance with claim 10 wherein said metering orifice includes a metering pin which is supported through said casing and movable in said orifice to control its metering area and thereby control hydraulic resistance to cushioning stroke of said device.

References Cited in the file of this patent
UNITED STATES PATENTS
2,963,175    Thornhill  ---------------- Dec. 6, 1960

UNITED STATES PATENT OFFICE
CERTIFICATE OF CORRECTION

Patent No. 2,994,442                           August 1, 1961

George E. Frederick

It is hereby certified that error appears in the above numbered patent requiring correction and that the said Letters Patent should read as corrected below.

Column 1, line 37, for "aborbs" read -- absorbs --; column 3, line 57, for "outwardly" read -- inwardly --; column 10, line 50, for "recive" read -- receive --.

Signed and sealed this 3rd day of April 1962.

(SEAL)
Attest:

ERNEST W. SWIDER                               DAVID L. LADD
Attesting Officer                                  Commissioner of Patents